United States Patent
Barnett et al.

[15] 3,677,612
[45] July 18, 1972

[54] COATED FLUID BEARING FOILS AND FABRICATING METHOD

[72] Inventors: Morris A. Barnett, Palos Verdes Estates; Alexander Silver, Tarzana, both of Calif.

[73] Assignee: The Garrett Corporation, Los Angeles, Calif.

[22] Filed: April 3, 1969

[21] Appl. No.: 813,066

[52] U.S. Cl. ..................................308/5, 308/9, 308/168
[51] Int. Cl. ................F16c 17/00, F16c 17/02, F16c 17/04
[58] Field of Search ..............308/5, 9, DIG. 1, DIG. 7, 238, 308/37, 121, 122, 160

[56] References Cited

UNITED STATES PATENTS

| 3,047,934 | 8/1962 | Magner | 308/238 |
|---|---|---|---|
| 3,215,480 | 11/1965 | Marley | 308/DIG. 1 |
| 3,382,014 | 5/1968 | Marley | 308/9 |

FOREIGN PATENTS OR APPLICATIONS

| 821,954 | 10/1959 | Great Britain | 308/DIG. 7 |
|---|---|---|---|
| 857,832 | 1/1961 | Great Britain | 208/DIG. 7 |

*Primary Examiner*—Martin P. Schwadron
*Assistant Examiner*—Frank Susko
*Attorney*—Fraser and Bogucki

[57] ABSTRACT

A method of providing an improved fluid foil bearing by coating the foil segments with a solid lubricant. Coated foils for both journal and thrust bearings are also disclosed.

6 Claims, 5 Drawing Figures

Patented July 18, 1972

3,677,612

INVENTOR.
MORRIS A. BARNETT
ALEXANDER SILVER

BY Fraser and Bogucki

ATTORNEYS

COATED FLUID BEARING FOILS AND FABRICATING METHOD

BACKGROUND OF THE INVENTION

The present invention relates to foil bearings and, in particular, to a fluid foil bearing having foil segments coated with a solid lubricant.

DESCRIPTION OF THE PRIOR ART

Fluid bearings are well known in the prior art and are comprised generally of two elements, a fixed element and a movable element with a predetermined spacing therebetween. The spacing is filled with a fluid such as air which under dynamic conditions forms a supporting "wedge" to provide sufficient support of a load by preventing contact between the movable and the stationary elements. More recently it has been found that improved operation of a fluid bearing, particularly gas bearings of the hydrodynamic type, may be realized by providing foils in the space between the bearing elements. Such foils are generally thin sheets of a thickness such that they are deflected by hydrodynamic film forces between the adjacent bearing surfaces and the foils. The foils enhance the hydrodynamic characteristics of the gas bearings and also provide improved operation under extreme load conditions when normal bearing failure might otherwise occur. Additionally, foil segments are provided for the added advantage of accommodating eccentricity of the movable element and of providing a cushioning and dampening effect so as to reduce or eliminate synchronous whirl and half speed whirl instability as more fully explained in U. S. Pat. No. 3,215,480. The foil segments are resilient and move under dynamic conditions in response to the pressure created by the relative motion of the bearing elements. An example of a foil type bearing is illustrated in U. S. Pat. 3,215,480, assigned to the assignee of the present invention.

However, certain problems have arisen when using foil bearings under the strenuous conditions of high operating speed and high temperatures. Additionally, under repeated start and stop operations, bearing life has been severely limited due to excessive wear. Finally, the general strength of the foil segments and their ability to sustain momentary overloads have always been problems under severe operating conditions such as may be encountered with foil bearings used in aircraft cooling compressors and other units in aircraft service.

It is, therefore, a general object of the present invention to provide an improved foil bearing and methods for the fabrication thereof.

It is a more specific object of the present invention to improve the ability of a foil bearing to survive momentary overloads.

It is another object of the present invention to provide a foil bearing structure having a significant improvement in performance.

It is a further object of the present invention to increase the start-stop life of foil type fluid bearings.

It is another object of the present invention to increase the effective strength of the foil assembly of a foil bearing.

SUMMARY OF THE INVENTION

The present invention obviates the problems described above by providing a coated foil bearing and a method of preparing the foils of the foil bearing comprising the steps of providing a foil material, and coating one side of the foil material with a solid lubricant. One particular solid lubricant material which has proven satisfactory is a stratified fluorocarbon sold under the trade name Teflon-S type 958-200 Series and available from E. I. Du Pont de Nemours & Co. (Inc.), Burlingame, California. In particular, the side of the foil adjacent the rotating member is coated with the solid lubricant to provide the desired coating. The coating of the foils may be realized in a number of ways, as by spraying or by prefabricating in layers and affixing the coating by adhesive, for example.

A fluid foil bearing having coated foil segments provides a fluid bearing having increased effective load capacity and durability for high temperature, high speed and frequent stop-start operation. While the load capacity of the fluid film is not affected, the effective load capacity is increased because the bearing of the invention permits running contact without failure under some conditions which would destroy conventional fluid foil bearings.

In one particular arrangement in accordance with the invention in the form of a journal bearing, the foils are preferably overlapped with the coated side inward, although overlapping of the foils is not essential to effective operation of such arrangements. The coating which is applied is a form of solid lubricant having suitable adhering properties to develop adhesion with the associated foil. Formed in this manner, the coated sides of the foils are in a position to provide positive lubrication with the adjacent rotating shaft surface in the event of transient overloads, shaft excursions due to whirl and the like, and also serve to improve the start-stop characteristic of the bearing by reducing the friction torque and wear on starting and stopping of shaft rotation.

In another embodiment, similar advantageous results are obtained in a thrust bearing in accordance with the invention utilizing coated foil segments in a non-overlapping configuration. The foil segments are coated on the side facing the rotating thrust plate.

A better understanding of the invention may be gained from a consideration of the following detailed description, taken in conjunction with the accompanying drawings, wherein.

Figure 1:
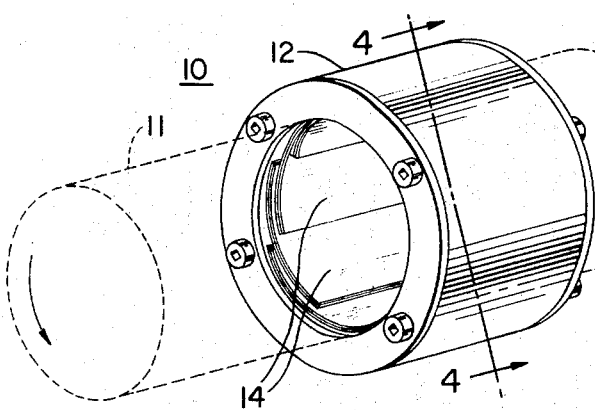
FIG. 1 is a perspective view of a fluid foil journal bearing in accordance with one particular arrangement of the invention.
Figure 4:
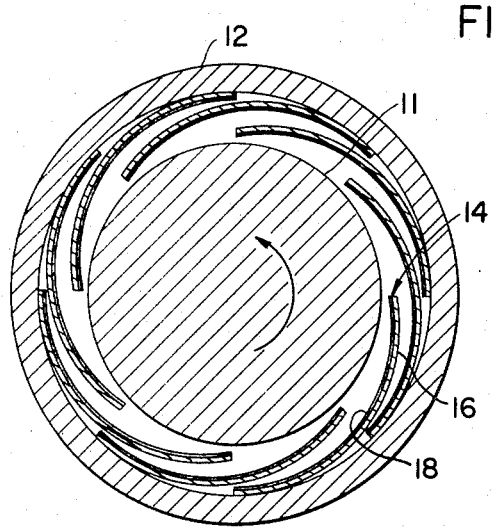
FIG. 4 is an enlarged sectional view taken along the line 4—4 in FIG. 1 and showing coated foils in accordance with the invention in position within a bearing.

Referring now to FIG. 1, there is illustrated a journal bearing 10 having a rotatable shaft 11, indicated in broken outline, mounted within a stationary bushing 12. Of course such a bearing may also provide for a fixed shaft with a rotating collar member positioned thereon. The interior of the bushing 12 contains a plurality of foil segments 14 in a configuration shown more clearly in the sectional view of FIG. 4. FIG. 4 illustrates eight foil segments 14, each having approximately a 90° wrap angle with about 50 percent overlap, and each comprising a metal substrate or base 16 of a material such as Inconel X750, with a solid lubricant coating 18 such as Teflon-S type 958-200 Series applied to the surface or side of the base 16 adjacent the shaft 11. The individual segments 14 are held in place by being secured to the inner surface of the bushing 12 by any suitable means, as for example by the anchoring arrangement shown in copending application Ser. No. 811,951, assigned to the assignee of this application.

Figure 2:
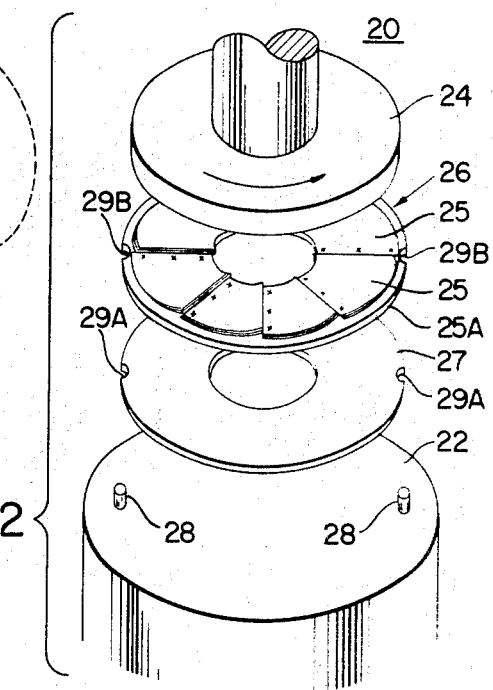
FIG. 2 is an exploded perspective view of a fluid foil thrust bearing in accordance with a second particular arrangement of the invention.

Referring now to FIG. 2, there is illustrated an exploded view of a thrust bearing 20 shown having a stationary mounting plate 22, a rotatable runner 24 and a foil support assembly 26 which includes a foil support plate 25A with foils 25 affixed thereto. Also shown is a stiffening shim 27. Locating pins 28 are provided to engage notches 29A and 29B in the shim 27 and foil support plate 25A respectively to lock these elements together against relative rotation. The foil support assembly 26 as shown comprises eight foil segments 25 each subtending approximately 45° of arc with a slight gap between adjacent foils. The foil surfaces adjacent the thrust runner 24 are coated with a solid lubricant and generally function in the same fashion as the journal bearing illustrated in FIG. 1. In the embodiment shown in FIG. 2, the individual foil segments 25 are secured to the backing plate 25A by spot welding at the forward edge, relative to runner rotation.

Figure 3:
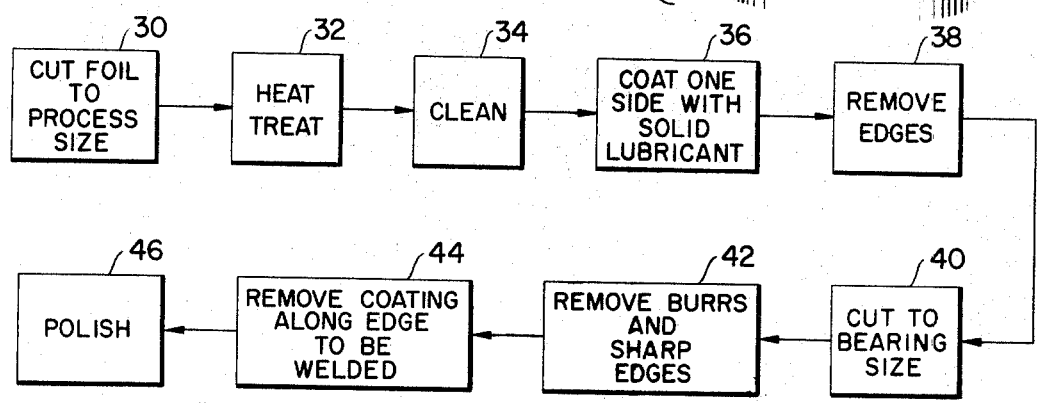
FIG. 3 is a block diagram representing a preferred method of preparation of a foil bearing segment in accordance with one aspect of the invention.

It has been found that fluid bearings of the type described are capable of substantially improved operation when foils coated with a solid lubricant are employed. An example of a solid lubricant which has worked well in practice is Teflon-S type 958-200 Series. Coated foils of the type utilized in preferred embodiments of the invention may be fabricated in accordance with the method diagrammatically represented in FIG. 3. The method illustrated comprises receiving a bulk base or substrate material, such as Inconel X750, which is cut into any convenient processing size in a step designated 30. The next step 32 provides heat treatment of the material. The heat treating step depends to some extent upon the particular base material used. For example, when Inconel X750 is used, the heat treating step 32 may be accomplished in an inert atmosphere to eliminate oxidation at the surfaces which might interfere with the bond strength of the finished coating. The Inconel X750 is placed in an oven in such a way that the pieces are only lightly in contact if at all. The material is heated to 1300° F. and this temperature is held for 20 hours. In some applications, an acceptable alternative procedure is to elevate the material temperature to 1400° F. and hold for one hour.

After heat treating, the base material is cleaned in a step 34. In the case of Inconel X750, cleaning comprises immersion of the base material in an alkaline permanganate solution for one hour, followed by immersion in a 20 to 25 percent solution of nitric acid, for a maximum of one minute.

The next step 36 comprises coating the material, preferably on the side which will be exposed to sliding friction with a relatively movable surface, with a solid lubricant. A preferred lubricant a stratified fluorocarbon material available commercially under the trade name Teflon-S type 958-200 Series. The coating may be applied by spraying one side of the base material following the application procedures recommended by the manufacturer. One such application procedure includes electrostatic spraying or the use of an air gun at approximately 40 psi pressure using the normal procedures for applying synthetic enamels. The spray application is followed by heat curing at approximately 600° F. Alternatively, the foil coating step may be effected by the use of prefabricated sheets of solid lubricants such as the aforementioned Teflon-S type 958-200 Series which are affixed to the metal foils by a suitable adhesive. Other alternative methods of applying the solid lubricant coating to one side of the metal foil may also be employed.

Coating thicknesses have varied between 0.001 and 0.0014 inch with good results being obtained. After the material has been coated, the next step 38 comprises removing a ¼ inch wide strip from the edges of the material. This step is included because, without trimming, the coating thickness is not uniform at the edges of the material. Removal may be by any suitable instrument such as a properly sharpened and adjusted sheet metal shear or punch.

The next step 40 is cutting the coated material to the predetermined size for the particular bearing, with the cutting being performed by a properly sharpened and adjusted sheet metal shear or sheet metal punch or the like. The cutting is initiated at the coated side and proceeds toward the uncoated side of the material, to avoid raising burrs along the cut edge.

The next step 42 is removing any formed burrs by honing the edges of the cut material. Additionally, all sharp edges are removed.

The next step 44 is removal of the coating along that edge of the foil which is to be attached to one of the elements of the bearing. This is appropriate where attachment of the foil comprises spot welding the foil to a support member for retaining the foils in the desired configuration for insertion in the bearings, as in the embodiment of FIG. 2.

Figure 5:
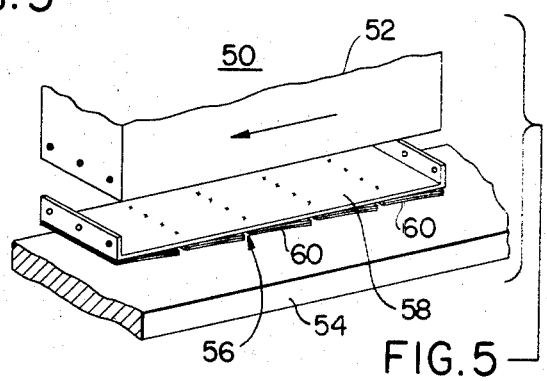
FIG. 5 is an exploded view of a linear fluid foil bearing constructed in accordance with yet another arrangement of the invention.

FIG. 5 is an exploded perspective view of yet another particular arrangement in accordance with the invention comprising a linear bearing configuration 50 in the form of a shoe 52 which is movable relative to a base 54. A foil plate assembly 56 is positioned between the shoe 52 and the base 54 and is shown for attachment to the shoe 52 by fasteners, such as pins (not shown), which may be inserted within a plurality of mounting holes at the opposite ends of the shoe 52. As shown, the plate assembly 56 comprises a plate 58 to the underside of which are affixed a number of individual foils or pads 60. The foils 60 may be affixed to the plate 58 by suitable means such as by spot welding at their respective leading edges, relative to the direction of motion of the shoe 52. Each of the pads 60 is provided along its underside (the side which may be subject to frictional engagement with the base 54) with a solid lubricant coating provided in the manner described hereinabove. Thus, while this arrangement functions as a fluid foil bearing for supporting the load-bearing shoe 52, the coated fluid foils or pads 60 fabricated in accordance with the present invention advantageously improve the load carrying characteristics of the linear bearing structure 50.

An optional step 46 when forming a foil for a bearing in accordance with the invention involves polishing the coated surface to remove any high spots and to provide a smoother and more uniform surface finish than may be achieved in the "as coated" condition. Generally each foil should have a uniform dimension over its entire length whether used in a journal bearing, such as in FIG. 1, a thrust bearing as in FIG. 2, or a linear bearing as in FIG. 5. The uniformity is critical in controlling wear life and effective load capacity of the bearing.

It is to be noted that the base material such as Inconel X750 may be altered, depending upon the particular requirements of the environment into which the bearing is going to be placed, and may vary, depending upon the corrosion resistance necessary, the required structural strength, and any other properties or characteristics desired.

Likewise, Teflon-S type 958-200 Series as a preferred solid lubricant coating may be replaced by other lubricant materials as better materials become available or if environmental conditions require different properties from those possessed by the above-mentioned Teflon-S type 958-200 Series.

It has been found that a fluid foil bearing constructed as described above is capable of operating at temperatures in excess of 500° F. Such bearings have been tested through more than 30,000 cycles of start-stop operation, as well as operation at speeds well above 100,000 rpm. This represents a substantial improvement over previously known foil bearings which do not incorporate the coated foils of the invention. The provision of the coated foil structures as described is believed responsible for improving the performance of bearings under extreme conditions.

Although there have been described above particular arrangements of coated fluid bearing foils and methods of fabrication thereof in accordance with the invention for the purpose of illustrating the manner in which the invention may be used to advantage, it will be appreciated that the invention is not limited thereto. Accordingly, any and all modifications, variations or equivalent arrangements which may occur to one skilled in the art should be considered to be within the scope of the invention.

What is claimed is:

1. A fluid foil bearing of the type designed to operate at rotational speeds on the order of at least 100,000 rpm by forming a fluid film between a rotating part and a plurality of foil segments in which:

each of the foil segments is coated on at least one side thereof with a solid lubricant comprising a stratified fluorocarbon material.

2. A fluid foil bearing comprising:

a pair of elements arranged for relative movement with respect to one another, one of the elements being adapted to support the other through the formation of a fluid film between one of the elements and a plurality of foils positioned between the elements, the foils being operative to form supporting wedges in the fluid film; and a solid lubricant material affixed to at least one surface of each of the foils, said solid lubricant material comprising a relatively thin layer of stratified fluorocarbon material of substantially uniform thickness having non-stick and low friction properties.

3. A fluid foil bearing comprising:
a bushing;
an opening for receiving a rotatable shaft within the bushing; and
a plurality of foils affixed to the interior surface of the bushing opening and distributed with substantially equal spacing about the interior of the opening, each of said foils comprising a metal base material coated on at least one side with a solid lubricant comprising a stratified fluorocarbon material.

4. A fluid foil bearing in accordance with claim 3 wherein the solid lubricant coating is on the interior surfaces of the foils as they are positioned within the bushing.

5. A fluid foil bearing in accordance with claim 2 wherein said one of the elements comprises a thrust runner and the other element comprises a mounting plate and a foil support assembly, the foil support assembly including a support plate having said plurality of foils affixed thereto.

6. A fluid foil bearing in accordance with claim 2 wherein said bearing comprises a linear bearing in which said one of the elements comprises a base and the other element comprises a load supporting member capable of undergoing linear motion relative to the base and mounting said plurality of foils.

* * * * *